(12) United States Patent
Johnson et al.

(10) Patent No.: US 7,788,985 B2
(45) Date of Patent: Sep. 7, 2010

(54) ROTATIONAL TESTING SYSTEM

(75) Inventors: Donald Bryce Johnson, Algonac, MI (US); Norman Malcolm Newberger, White Lake, MI (US); Isaac Cohen Anselmo, Livonia, MI (US)

(73) Assignee: Horiba Instruments Incorporated, Troy, MI (US)

(\*) Notice: Subject to any disclaimer, the term of this patent is extended or adjusted under 35 U.S.C. 154(b) by 61 days.

(21) Appl. No.: 12/182,532

(22) Filed: Jul. 30, 2008

(65) Prior Publication Data

US 2010/0024571 A1  Feb. 4, 2010

(51) Int. Cl.
*G01L 3/16* (2006.01)
(52) U.S. Cl. .................. 73/862.09; 73/760; 73/856
(58) Field of Classification Search ............... 73/862, 73/862.09, 121–132, 760, 856
See application file for complete search history.

(56) References Cited

U.S. PATENT DOCUMENTS

| | | | |
|---|---|---|---|
| 1,815,807 A | 7/1931 | Stamm et al. | |
| 2,484,241 A | 10/1949 | Mulheim | |
| 2,827,785 A | 3/1958 | Robinson | |
| 3,796,092 A * | 3/1974 | Klinger et al. | 73/794 |
| 3,851,524 A | 12/1974 | Liu | |
| 4,680,975 A | 7/1987 | Dodt | |
| 5,139,120 A | 8/1992 | Gomi | |
| 5,784,929 A | 7/1998 | Abraham et al. | |
| 5,829,320 A | 11/1998 | Abraham et al. | |
| 5,831,179 A | 11/1998 | Abraham et al. | |
| 5,975,261 A * | 11/1999 | Woerner et al. | 192/3.29 |
| 7,264,101 B2 * | 9/2007 | Hauck et al. | 192/55.61 |
| 2004/0238219 A1 * | 12/2004 | Nichols et al. | 175/57 |

FOREIGN PATENT DOCUMENTS

| | | |
|---|---|---|
| JP | 58146745 A2 | 9/1983 |
| JP | 2000161437 | 6/2000 |

OTHER PUBLICATIONS

Search Report from PCT/US2009/051232, dated Sep. 1, 2009.

\* cited by examiner

*Primary Examiner*—Max Noori
(74) *Attorney, Agent, or Firm*—Brooks Kushman P.C.

(57) ABSTRACT

A rotational testing system for a test article includes a rotational test stand. The rotational test stand includes a rotating element having a drive end capable of being mechanically coupled with the test article. The rotational testing system also includes a non-isolating torsional damper attached to the rotating element.

18 Claims, 3 Drawing Sheets

ROTATIONAL TESTING SYSTEM

BACKGROUND

Dynamometers may be used for measuring the performance of rotating machinery including combustion engines, chassis and drive trains. The automotive industry, for example, uses dynamometers to test transmissions: an input dynamometer provides a torque that would normally be generated by an engine and an output dynamometer provides a load that would normally be provided by a vehicle. In a typical transmission dynamometer test configuration, an output shaft of the input dynamometer is coupled to an input shaft of the transmission. The output of the transmission connects through a shaft to the output dynamometer.

Dynamometer testing may be performed over various operating speeds and torques ranging between idle and maximum rated speed while under different loading conditions.

Larger dynamometers operated at lower speeds typically have lower natural frequencies. Larger dynamometers often produce more torsional vibration and stress compared to smaller dynamometers operated at higher speeds.

Torsional vibration may result, for example, from the excitation of a spring mass system formed by the inertia of one of the dynamometers, the attached inertia of the transmission torque converter (for instance) and the spring of the shaft connecting the dynamometer and the torque converter. As connections between the input dynamometer and specimen become stiffer in torsion, the sensitivity of the natural frequency may increase. Thus, small excitations in torque (even at levels normally considered out of scope noise by amplitude and frequency content) may be amplified at resonance to levels that confound the measurements of the dynamometer.

Flexible couplings may be interconnected between the input/output dynamometers and the transmission mentioned above to reduce natural frequency vibrations, and in particular, torsional vibration resulting, for example, from noise introduced from the variable frequency drive exciting the inertias and shafting of the test configuration. Flexible couplings, however, may present several issues. For example, they may reduce the stiffness of the connection between the dynamometer and transmission, thus reducing the response of the system. They may also wear out, produce dust and fumes as they wear, and need to be replaced periodically.

FIG. 1 illustrates an example plot of torque versus time (at a speed of 140 rads/sec) for a transmission test input dynamometer. The peak-to-peak torsional vibration of the system is approximately 700 nm. Such torsional vibration may be undesirable because of its high amplitude. It may be avoided by operating the dynamometer in a region of speed and torque outside the region that would excite this torsional vibration. Certain test applications, however, require the operation of the dynamometer in regions likely to produce torsional vibration.

SUMMARY

A rotational testing system for a test article includes a rotational test stand for at least one of (i) rotatively driving the test article and (ii) providing a rotational load for the test article. The rotational test stand includes a rotating element having a drive end capable of being mechanically coupled with the test article. The rotational testing system also includes a non-isolating torsional damper attached to the rotating element.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 2:
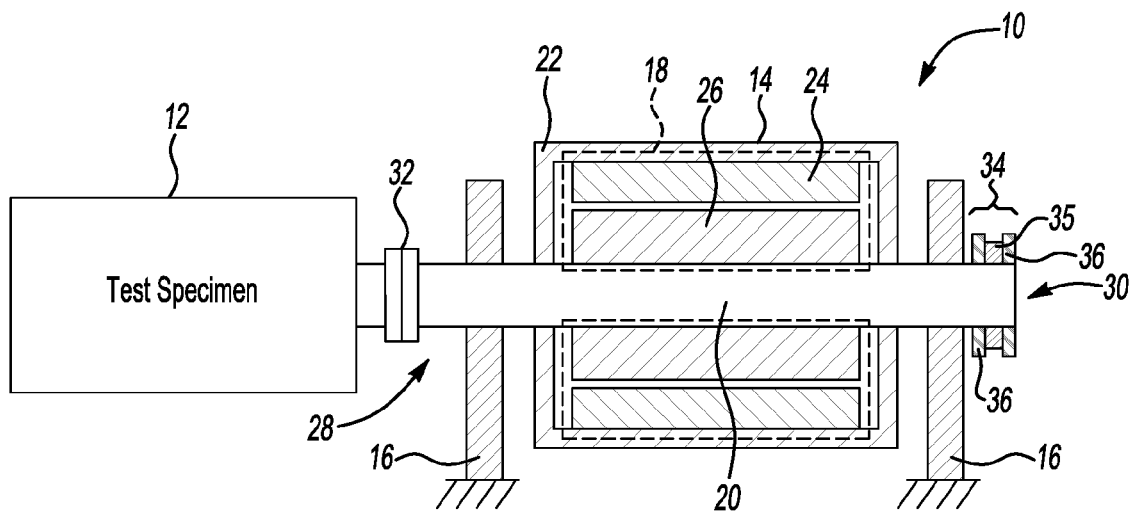
FIG. 2 is a side view, in partial cross-section, of a portion of a rotational test system according to an embodiment of the invention.

FIG. 2 illustrates an embodiment of a test stand 10 for a test specimen 12, e.g., transmission, chassis, etc. The test stand 10 includes, for example, a dynamometer 14 mounted on support legs 16. Of course, other rotational test machines may be used. The dynamometer 14 includes an electric machine 18 and shaft 20 disposed within a housing 22. The support legs 16 support the shaft 20 via bearings (not shown). In other embodiments, the dynamometer 14 may include several shafts (not shown) mechanically connected together.

The electric machine 18 includes a stator coil 24 and rotor 26. The stator coil 24 is fixedly attached with the housing 22. The rotor 26 is fixedly attached with the shaft 20. The shaft 20 and rotor 26, thus, rotate together. Other configurations are also possible.

The dynamometer 14 has a drive end 28 and a non-drive end 30. The shaft 20 is mechanically connected with the test specimen via a torque transducer 32 at the drive end 28. Any suitable technique, however, may be used to mechanically connect the test specimen 12 and dynamometer 14.

A non-isolating torsional damper 34, i.e., a torsional damper not intended to transmit torque between the test specimen 12 and dynamometer 14—a torsional damper not in the torque path between the test specimen 12 and dynamometer 14, is mechanically coupled/connected with the shaft 20 (and surrounds the shaft 20) at the non-drive end 30. In other embodiments, the non-isolating torsional damper 34 may be mechanically coupled/connected with the shaft 20 at any location along the shaft 20.

The non-isolating torsional damper 34 may employ any suitable damping technology such as rubber, fluid, magnetic, etc. The non-isolating torsional damper 34 may be a tuned damper or wide spectrum damper. The non-isolating torsional damper 34 may also be an active damper or passive damper.

Figure 1:
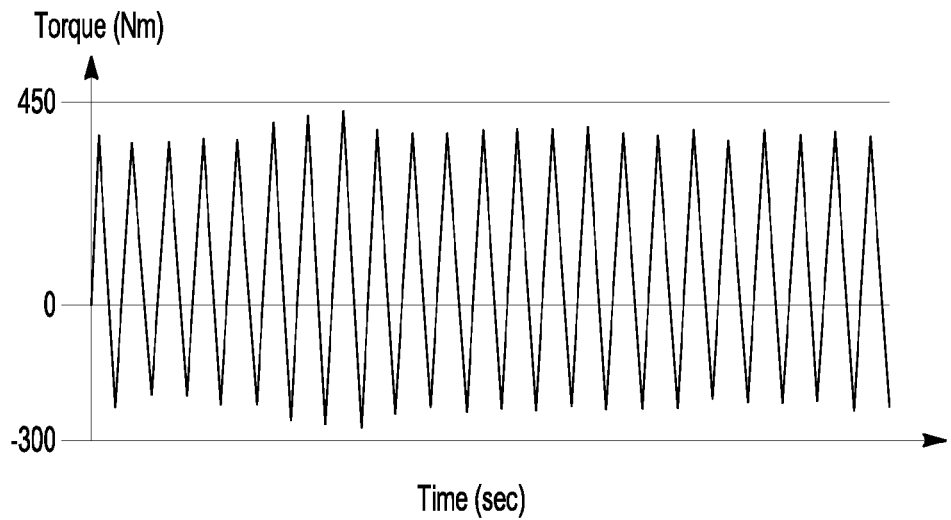
FIG. 1 is an example plot of torque versus time for a twin dynamometer system.

The non-isolating torsional damper 34 of FIG. 1 includes an inertial element 35 and compliant members 36. The inertial element 35 may be selected to have an inertia that is 5% to 10% the rotating inertia of the electric machine 18. This damper inertia may be coupled through the compliant members 36, such as rubber or viscous fluid, to the shaft 20. If rubber is used, it forms a spring whose spring constant is selected to reduce the resonance. (Typically, softer rubbers reduce low frequency resonances and harder rubbers reduce high frequency resonances.) The inertia and spring form what is often referred to as a spring-mass damper. As apparent to those of ordinary skill, through the selection of the inertia and spring, the non-isolating torsional damper 34 may be tuned to reduce and/or eliminate the resonance. (A viscous damper is a type of wideband damper. It may be effective at reducing resonances of all frequencies.) Of course, the non-isolating torsional damper 34 may be configured and/or tuned in any suitable fashion to achieve the desired performance.

The non-isolating torsional damper 34 may absorb excitations that force the dynamometer 14 into resonance and may also dampen any resonance if it occurs. In certain embodiments, the non-isolating torsional damper 34 need only be of a size sufficient to dissipate the energy input to the test stand 10 that may cause resonance. In the embodiment of FIG. 1, this energy may come from the electric machine 18. This energy may also come from the test specimen 12.

The electric machine 18, e.g., variable frequency drive, may create high frequency distortions that contain enough energy to act as a forcing function to the natural frequency of rotation. (The natural frequency of rotation is a property of rotating machines.) Typical dynamometer designs, however, allow for operation at frequencies other than the natural frequency. For example, to achieve dynamometer speeds of 0 to 9000 rpm, the electric machine 18 may produce power sine wave signals having frequencies from 0 to 300 Hz. These power sine waves, however, may have low level amplitude distortion at multiples of these frequencies. If one of these distortion frequencies is the same as the natural frequency of the electric machine 18, the shaft 20 and specimen 12 may begin to oscillate. For example, the dynamometer 14 and specimen 12 may have a rotating natural frequency of 450 Hz. To operate at a speed of 6,750 rpm, a power sine wave having a frequency of 225 Hz may be required. Minute distortions at 450 Hz, 900 Hz, 1800 Hz, etc., however, may occur. The energy associated with these distortions, although relatively small, may be enough to excite the electric machine 18 into resonance. As apparent to those of ordinary skill, the non-isolating torsional damper 34 counters these small disturbances and therefore minimizes/eliminates the resonance condition.

Figure 3:
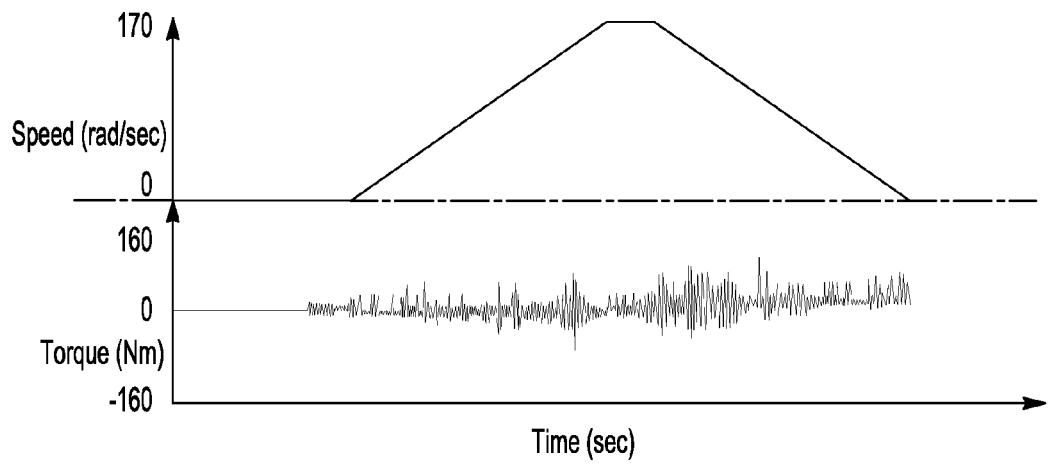
FIG. 3 is an example plot of speed versus torque for the rotational test system of FIG. 2.

FIG. 3 illustrates an example plot of the speed and torque of the dynamometer 14 without the non-isolating torsional damper 34.

Figure 4:
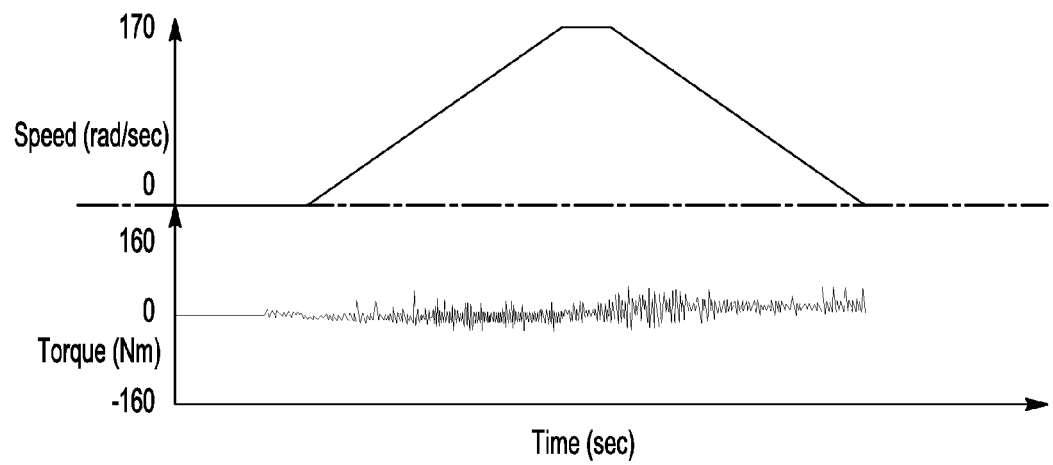
FIG. 4 is another example plot of speed versus torque for the rotational test system of FIG. 2.

FIG. 4 illustrates an example plot of the speed and torque of the dynamometer 14 with the non-isolating torsional damper 34. FIG. 4 shows a significant reduction in torque noise (approximately 300%) due to resonance relative to FIG. 3.

Figure 5:
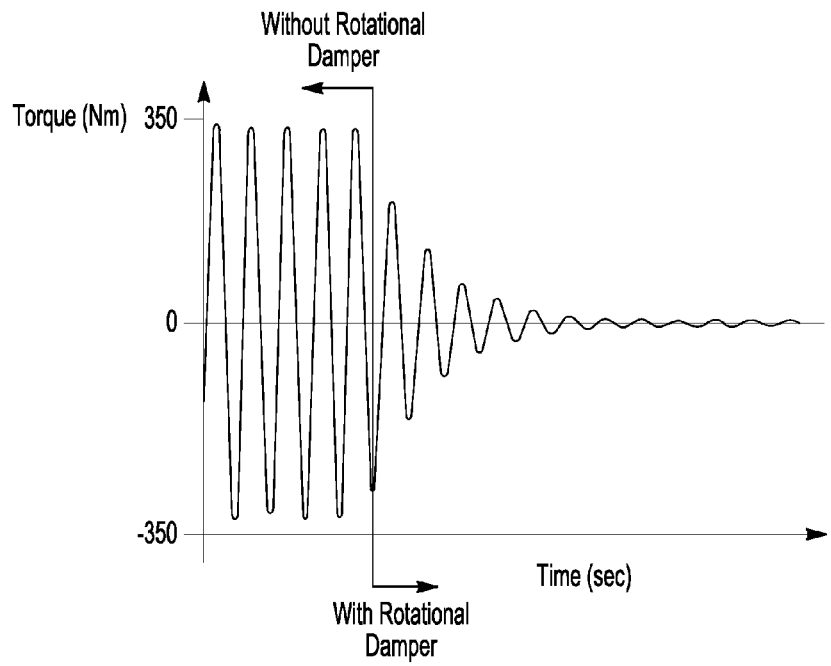
FIG. 5 is an example plot of torque output of a simulated embodiment of a rotational test system according to an embodiment of the invention.

FIG. 5 illustrates an example plot of the torque output of a simulated rotational test system 10 before and after the non-isolating torsional damper 34 is connected. Before the non-isolating torsional damper 34 is connected, the peak-to-peak amplitude is approximately 700 nm. After the non-isolating torsional damper 34 is connected, the peak-to-peak amplitude settles to about 3 nm.

Figure 6:
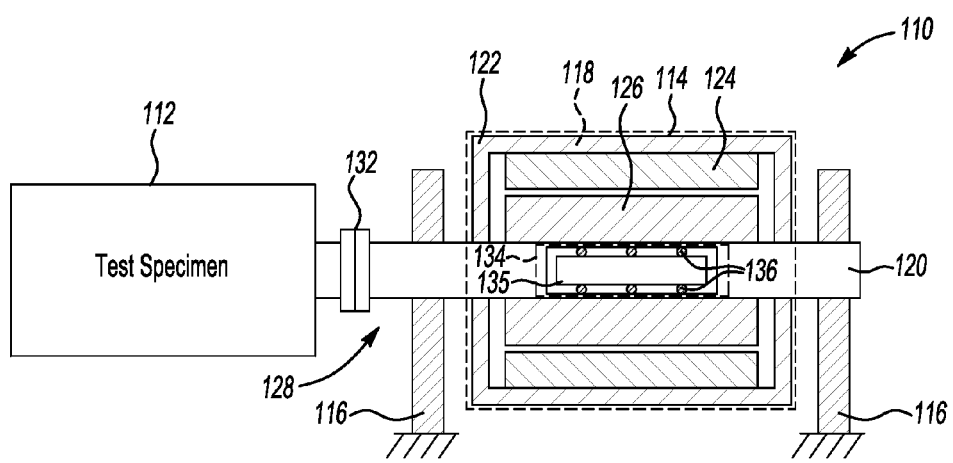
FIG. 6 is a side view, in partial cross-section, of a portion of a rotational test system according to another embodiment of the invention.

FIG. 6 illustrates another embodiment of a test stand 110. Numbered elements that differ by 100 relative to FIG. 1 have similar, although not necessarily identical, descriptions to the numbered elements of FIG. 1.

The test stand 110 includes a dynamometer 114. The dynamometer 114 includes an electric machine 118 and a hollow shaft 120 disposed within a housing 122. The electric machine 118 includes a stator coil 124 and rotor 126. The stator coil 124 is fixedly attached with the housing 122. The rotor 126 is fixedly attached with the shaft 120. The shaft 120 and rotor 126, thus, rotate together.

A torsional damper 134 is disposed within the shaft 120. The torsional damper 134 of FIG. 6 includes an inertial element 135 and compliant members 136, e.g., O-rings, springs, fluid, etc. The compliant members 136 surround the inertial element 135 and suspend it within the shaft 120.

As apparent to those of ordinary skill, the inertial element 135 may be selected so as to provide a desired inertia for the torsional damper 134. Similarly, the compliant members 136 may be selected so as to provide a desired stiffness for the torsional damper 134. As an example, the inertial element 135 may be selected to have an inertia that is 5% to 10% the rotating inertia of the electric machine 118, the compliant members 136 may be selected to have a desired spring constant, etc.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A rotational testing system for a test article, the system comprising:
    a rotational test stand for at least one of (i) rotatively driving the test article and (ii) providing a rotational load for the test article, the rotational test stand including a rotating element having a drive end capable of being mechanically coupled with the test article; and
    a non-isolating torsional damper attached to the rotating element, including a compliant member and configured for damping vibration of the rotating element without transmitting torque between the test stand and test article through the compliant member.

2. The system of claim 1 wherein the rotating element has a non-drive end opposite the drive end and wherein the damper is mechanically connected with the non-drive end.

3. The system of claim 1 wherein the rotational test stand comprises a dynamometer.

4. The system of claim 1 wherein the rotating element comprises a shaft.

5. The system of claim 1 wherein the rotating element comprises a plurality of shafts mechanically connected together.

6. The system of claim 1 wherein the rotating element includes a surface defining a cavity and wherein the damper is disposed within the cavity.

7. The system of claim 1 wherein the damper comprises a tuned damper.

8. The system of claim 1 wherein the damper comprises a wide spectrum damper.

9. The system of claim 1 wherein the damper surrounds at least a portion of the rotating element.

10. The system of claim 1 wherein the damper includes an inertial element and a compliant member, the inertial element connected with the compliant member, the compliant member connected with the rotating element.

11. A rotational testing system for a test article, the system comprising:
    a dynamometer having a drive end and a non-drive end opposite the drive end, the drive end capable of being mechanically connected to the test article; and
    a non-isolating torsional damper mechanically connected to the non-drive end.

12. The system of claim 11 wherein the damper comprises a tuned damper.

13. The system of claim 11 wherein the damper comprises a wide spectrum damper.

14. The system of claim 11 wherein the damper includes an inertial element and a compliant member.

15. A rotational testing system for a test article, the system comprising:
- a dynamometer including a hollow shaft capable of being mechanically connected to the test article; and
- a non-isolating torsional damper disposed within the hollow shaft.

16. The system of claim 15 wherein the damper comprises a wide spectrum damper.

17. The system of claim 15 wherein the damper comprises a tuned damper.

18. The system of claim 15 wherein the damper includes at least one of an inertial element and a compliant member.

* * * * *